(12) United States Patent
Sun et al.

(10) Patent No.: US 9,446,681 B2
(45) Date of Patent: Sep. 20, 2016

(54) FLOW UNIFORMITY OF AIR-COOLED BATTERY PACKS

(71) Applicant: GM Global Technology Operations LLC, Detroit, MI (US)

(72) Inventors: Hongguang Sun, Whitby (CA); Regan P. Dixon, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 352 days.

(21) Appl. No.: 14/166,933

(22) Filed: Jan. 29, 2014

(65) Prior Publication Data

US 2015/0210184 A1 Jul. 30, 2015

(51) Int. Cl.

| | |
|---|---|
| *H01M 10/02* | (2006.01) |
| *H01M 10/36* | (2010.01) |
| *B60L 11/18* | (2006.01) |
| *B60L 3/00* | (2006.01) |
| *H01M 10/65* | (2014.01) |
| *H01M 10/613* | (2014.01) |
| *H01M 10/60* | (2014.01) |
| *H01M 10/625* | (2014.01) |

(52) U.S. Cl.
CPC .......... *B60L 11/1874* (2013.01); *B60L 3/0046* (2013.01); *B60L 2240/545* (2013.01); *H01M 10/60* (2015.04); *H01M 10/613* (2015.04); *H01M 10/625* (2015.04); *H01M 10/65* (2015.04); *Y02T 10/7005* (2013.01); *Y10S 903/907* (2013.01)

(58) Field of Classification Search
CPC ......... H01M 10/617; H01M 10/6566; H01M 10/6557; H01M 10/4207; H01M 10/5004; B60L 11/18; A47L 9/248; B29D 23/001
See application file for complete search history.

(56) References Cited

U.S. PATENT DOCUMENTS

| | | | | |
|---|---|---|---|---|
| 2,913,011 A | * | 11/1959 | Noyes | ..................... A47L 9/248 138/122 |
| 2011/0244291 A1 | * | 10/2011 | Sun | ................... H01M 10/4207 429/120 |

* cited by examiner

*Primary Examiner* — Kenneth Douyette
(74) *Attorney, Agent, or Firm* — Quinn Law Group, PLLC (57) ABSTRACT

A battery pack and method of cooling a battery pack. In one form, the battery pack is an assembly made up of numerous battery cells arranged within numerous modules. Cooling channels that receive cooling fluid from a ducted supply are placed between adjacent cells or cooling plates within each of the modules. The ducted supply includes beads or related area-increasing undulations that are designed to improve both the stiffness of the ducting as well as the uniformity of the flow rates of individual cooling channels within each of the modules. In one form, the pressure-enhancing beads are placed in an inlet portion of the ducting that is adjacent a forward portion of one or more of the sequentially-encountered modules in order to promote a more equitable distribution of the cooling fluid between the various cooling channels within each of the modules.

20 Claims, 4 Drawing Sheets

FLOW UNIFORMITY OF AIR-COOLED BATTERY PACKS

BACKGROUND OF THE INVENTION

This invention relates generally to an improved air-cooled battery pack with a plurality of battery cells that are used to generate motive power for vehicular and related transportation applications, and more particularly to varying the air flow amongst the individual battery cells within a battery cell module or pack such that the flow depends on each battery's position within the respective module or pack.

Various batteries, including lithium-ion, lead acid and nickel-metal hydride variants, may be configured to supplement or supplant conventional internal combustion engines (ICEs) for automotive and related transportation applications. The ability to passively store energy from stationary and portable sources, as well as from recaptured kinetic energy provided by the vehicle and its components, makes batteries (in general) and rechargeable batteries (in particular) ideal to serve as part of a propulsion system for cars, trucks, buses, motorcycles and related vehicular platforms. In one form suitable for automotive applications, the batteries are shaped as a generally thin pouched rectangular cell with edgewise-extending positive and negative voltage terminals that can be connected to a common electric current-carrying circuit. Two such cells may typically be combined into one battery unit, which in turn may be formed into even larger assemblies—including modules that in turn can be formed into a complete system known as a battery pack—to generate the desired power output. In one form of construction, the individual prismatic-shaped battery cells or their respective units are stacked along an axis that is normal to the planar faces of the cells and contained within a housing or related structure.

Battery packs are capable of generating significant amounts of excess heat during electric current charging and discharging operations. Left unchecked, this excess built-up heat may damage the cells and impact their operation. To help avoid this, cooling systems may be integrated into the battery pack. In configurations where the battery cells are stacked or arranged in a generally repeating manner, the housing or other battery structure may be formed around the cells to facilitate the delivery of air to the individual modules and cells within the battery pack. In one form, the fluid-delivery conduit may be in the form of an air manifold or plenum defined between the housing wall and the surface of the frame that holds edges of the individual cells. While such an approach has the virtue of providing a relatively unimpeded air flow path to all of the cells that are contiguous with the plenum, the potential exists for significant air flow (and concomitant temperature) non-uniformity among the individual battery cells; much of this is due to uneven pressure drops between the channels formed between adjacent cells or cooling plates as the air goes from the inlet plenum of the battery pack to the outlet plenum.

One particular form of battery pack configured with air cooling is known as the "Z-type" air-cooled battery pack. Z-type flow packs and U-type flow packs are two different arrangements of the air-cooled battery pack, where the names are in regard to the flow direction or pattern. In the Z-type flow, the cooling flows into the battery pack from the inlet such that it passes through an air manifold or plenum and over the top surface of the frame that holds the edges of the stacked cells, then down through the cooling channels that are formed between adjacent battery cells by the cells and their respective cooling plates, finally exits through the outlet by passing over the bottom surface of the frame that holds the edges of the stacked cells. By passing the air through the cooling channels, significant amounts of heat transfer may take place between the planar surfaces of the individual battery cells or cooling plate and the moving air. The inlet and outlet are located at the opposite sides of the battery pack. Conversely, in a U-type flow battery pack the inlet and outlet are typically at the same side of the battery pack. Although the uniformity of the flow rate of a Z-type flow pack can be improved by using curved upper and bottom plenums, the maximum variation of the flow rate of the individual cooling channels that define the space between adjacent battery cells or modules in the pack can still be as much as 20%. This problem is particularly significant in situations where there is a large distance between the last channel of a fluidly upstream battery module and the first channel of an adjacent downstream module; where this distance is larger than the distance between adjacent channels within the same module, the resulting pressure difference is such that the driving force (and resulting flow) in and around the first channel of each battery module is significantly reduced relative to its more closely-aligned intra-module channels.

In addition to cooling, structural rigidity considerations of the housing and cooling plenum of a conventional battery pack assembly should be addressed. While beads or related protrusions have been used to improve the stiffness of a cooling plenum used in a battery pack, the flow rate variation of individual cooling channels resulting from the use of such beaded packs is generally higher than its non-beaded counterpart. As such, the interests of a higher stiffness assembly structure may be at odds with optimum cooling flow designs.

SUMMARY OF THE INVENTION

In accordance with a first aspect of the present invention, modification of the surface of an air flow plenum or manifold about a series of battery cells arranged in a stacked relationship as part of a larger battery assembly (such as the aforementioned battery module or battery pack) is disclosed. In order to increase the inlet pressure of the first few channels at each battery module as a way to improve the uniformity of the flow rate of the individual cooling channels, the beads or related undulations that are used to enhance plenum stiffness may be built into the plenum flow path in particular locations as a way to promote a more equitable distribution of cooling fluid pressures. For example, by aligning such undulations into the cross-sectional area of the inlet plenum with the first few cooling channels of each module along the air flow direction, the beads (which may be thought of as forming indents or recesses within the inlet plenum at the portion of the plenum that corresponds to first few cooling channels of each module) increase local cross sectional area which in turn, locally increases the pressure. As such, this localized increase in static pressure tends to promote greater air flow through the adjacent channels of the first few cells of each module.

In the present context, the bead is any addition to the wall of the duct to not only enhance duct stiffness, but also improve the uniformity of the flow rates of individual cooling channels. Accordingly, bends, indentations and other features that are formed in the plenum or related ducting can raise the moment of inertia (and hence, stiffness) of the ducting, while simultaneously creating a favorable local high pressure regime for the coolant channels that are adjacent the beads. The width of each bead may be made to be approximately the same as the distance between two of the corresponding adjacent channels; this has the effect of reducing the variation in cooling air flow rate among the effected cells or modules by approximately 50%. Significantly, in situations where the beads are already being used to increase the stiffness of the plenum, their repositioning adjacent particular locations as discussed herein incurs no additional weight or complexity penalties. In one particular configuration, each battery module section has two beads placed on a surface of the inlet plenum adjacent the edges of the first few channels of each module.

In the present context, the battery pack is considered to be a substantially complete assembly or system of components necessary for propulsion of the vehicle for which the pack was designed, while battery modules and individual battery cells and cell units are (as mentioned above) considered to be subcomponents of the overall system. Such modular construction allows for ease of replacement of damaged or worn battery cells and modules without having to repair or replace the entire pack. Furthermore, an assembly of components for a battery pack used for vehicular applications may include—in addition to numerous battery cells—housings, cooling plates, frames, trays, securing mechanisms and other equipment that, while not contributing to the production of electric power, form an important part of the overall battery system assembly nonetheless.

According to another aspect of the invention, a battery pack assembly is disclosed that includes numerous modular battery cells, each configured to generate electric current. At least some of the battery cells are substantially aligned with one another to define a stacked relationship between them. In addition, numerous cooling channels are formed such that each acts as a cooling fluid flow path between an adjacently-spaced pair of the battery cells or cooling plates within the stacked relationship. These cooling channels fluidly cooperate with a plenum that is configured to circulate a cooling fluid for the various battery cells. At least a portion of the plenum includes one or more stiffness-enhancing beads formed on a surface thereof; such placement ensures that a portion of the cooling fluid being conveyed through the plenum is delivered to at least one of the adjacent cooling channels in such a way that the localized increase in pressure in the region around the bead promotes greater flow of a portion of the cooling fluid that enters into these cooling channels relative to those that are not adjacent the bead. In one form, a portion of the plurality of modular battery cells and a corresponding portion of the plurality of cooling channels define a battery module. Likewise, the stacked relationship of the battery cells within the battery module is such that the cooling fluid being delivered under increased pressure to the respective cooling channel (or channels) takes place at a forward portion of the battery module. In the present context, a forward portion of a module is that part which would first encounter an incoming cooling fluid. Contrarily, other portions of the module, be they middle portions, rear portions or the like, are those that would encounter the cooling fluid downstream of the module forward portion. In a non-limiting example, the forward portion of a module may correspond to any of the first one to three pair of battery cells (or cell units) in the module that may include eight to ten such cell units. Greater or fewer numbers of each may also be including, depending on the size of each module.

According to yet another aspect of the invention, an automobile propulsion system is disclosed. In the present context, the nature of the automobile will be understood to include all road-going vehicular platforms, including cars, trucks, motorcycles, buses or the like. The propulsion system includes a battery pack assembly made up of numerous battery cells arranged in modular format such that cooling channels are defined between adjacent the cells within each module, as well as between adjacent modules. The system further includes components configured to deliver cooling fluid (such as air) to the various cells and modules within the pack; such components include a plenum, conduit, manifold or related duct that is placed in fluid communication with channels that are formed between adjacent cells with each module, as well as between adjacent modules. In one form, this ducting delivers the cooling fluid in a substantially sequential manner along the flow axis (which generally coincides with the stacking axis mentioned elsewhere in this disclosure) to the battery cells, modules and corresponding cooling channels. Stiffness-enhancing beads are formed on a surface of the ducting, and are placed adjacent a forward portion of at least one of the modules. In this way, the increase in localized cross sectional area causes the portion of the cooling fluid that passes through the channels at the forward end of a particular module to experience a localized pressure increase, which in turn offsets the decrease in pressure at the forward end of a particular module caused by the large distance between the last channel of a fluidly upstream battery module and the first channel of an adjacent downstream module. In a like manner, such beads may also be placed in the portion of the duct that is axially between adjacent modules with the same increased pressure effects. As mentioned above, the strategic placement of these beads promotes a more equitable distribution of the cooling fluid between the various inter-module and intra-module cooling channels. Additional equipment may include an air storage and delivery system, a drivetrain and (if necessary) a separate internal combustion engine (ICE) to provide hybrid power.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
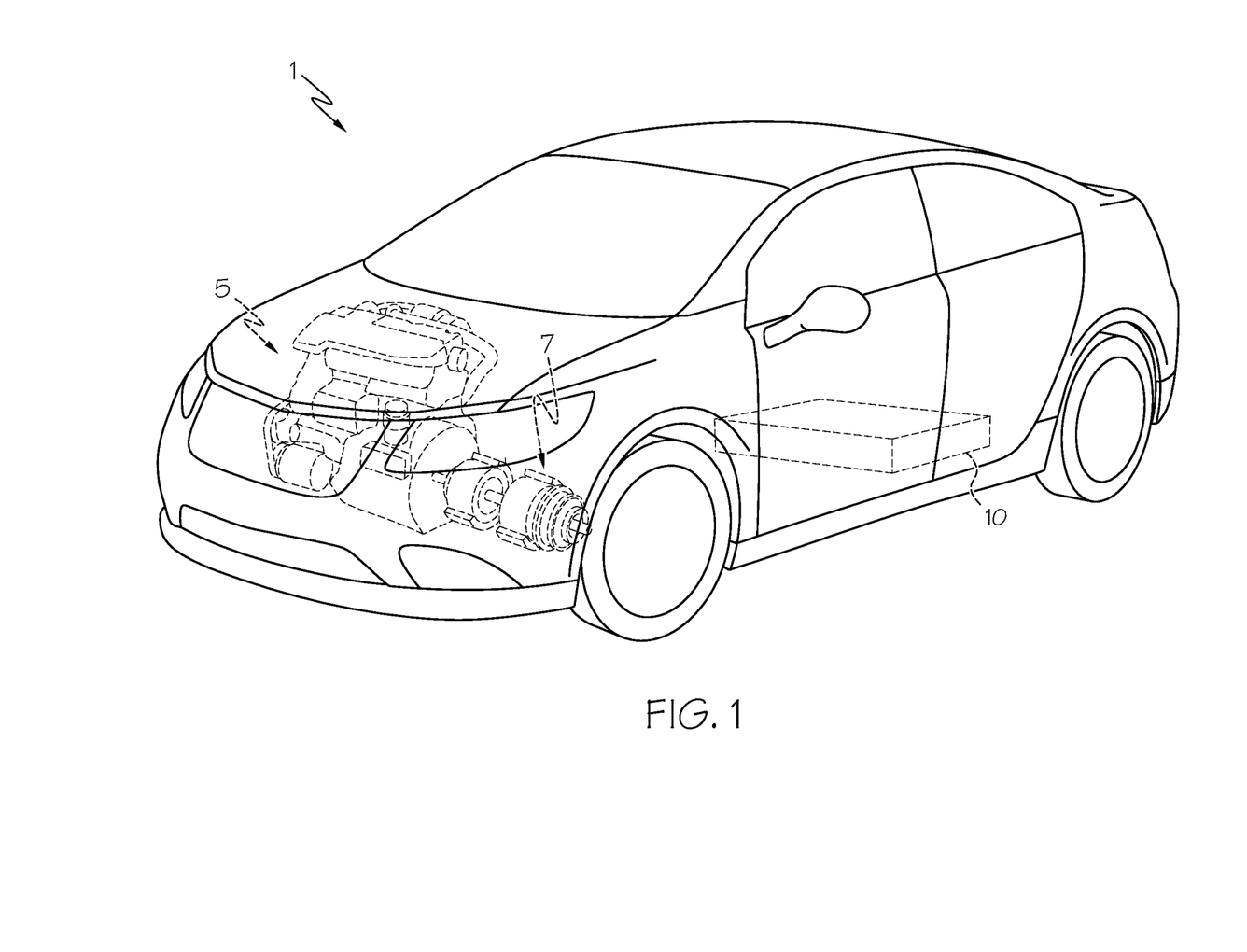
FIG. 1 shows a vehicle with a hybrid propulsion system in the form of an air-cooled battery pack and an internal combustion engine.

Referring first to FIG. 1, a vehicle 1 includes a hybrid propulsion system in the form of an electric power source made up of a conventional ICE 5 and a battery pack 10. Such a vehicle is known as a hybrid electric vehicle (HEV). It will be appreciated by those skilled in the art that vehicle 1 may not require an ICE 5, in such case, rather than being an HEV, it is an electric vehicle (EV); either form is within the scope of the present invention. An electric motor 7 may be coupled to one or both of the ICE 5 and battery pack 10 to provide traction to the wheels. Additional drivetrain components (none of which are shown) useful in providing propulsive power to one or more of the wheels and coupled to one or both of the battery pack 10 and ICE 5 are understood to include rotating shafts, axles, transmission, controllers or the like. While vehicle 1 is presently shown as a car, the applicability of the hybrid propulsion system to other such automotive forms (including trucks, buses, aircraft, watercraft, spacecraft and motorcycles) is deemed to be within the scope of the present invention.

Figure 2:
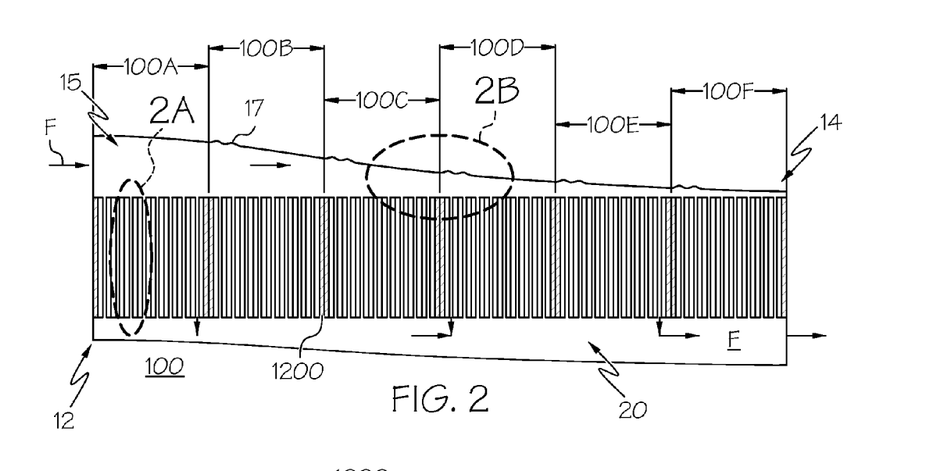
FIG. 2 shows cross-sectional elevation view of a stack of aligned individual battery cells and an inlet cooling plenum and outlet cooling plenum that make up a portion of an air-cooled battery pack according to the present invention where modifications to the inlet cooling plenum are included at specific locations.
Figure 2A:
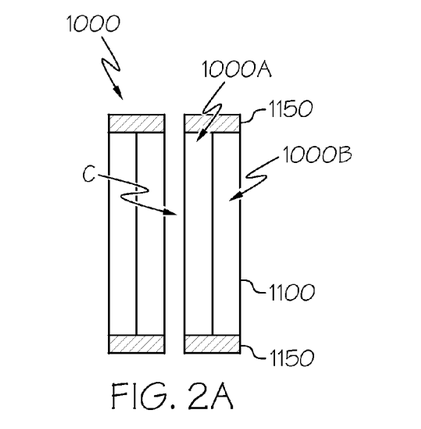
FIG. 2A shows details of a single battery cell unit from the battery pack of FIG. 2, where the single unit is made up of two pouched battery cells, respective cooling plates and portion of a frame.
Figure 2B:
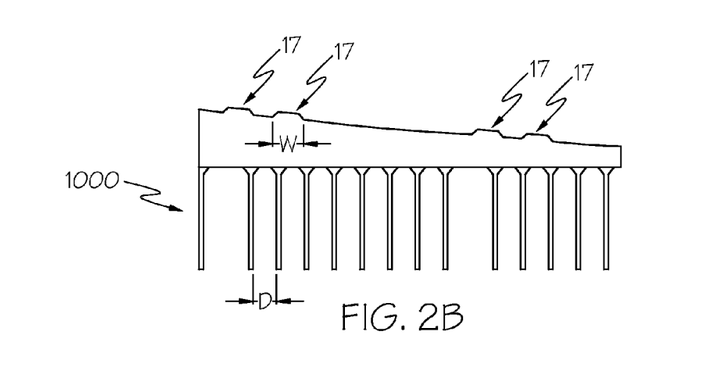
FIG. 2B shows more detail of beads placed in portions of the inlet plenum of FIG. 2 to facilitate a local increase in plenum stiffness and cooling air pressure rise.

Referring next to FIGS. 2, 2A and 2B, the battery pack 10 is made up of numerous battery modules 100 (shown individually as 100A through 100F) that in turn are made up of pairs (or units, as shown with particularity in FIG. 2A) of two individual battery cells 1000A, 1000B (which in one form are shaped into generally planar rectangular members) to form pouch cells that are placed between companion facing cooling plates 1100 and a frame 1150 that is used to provide structural support. Adjacent individual pouch cells may be stacked such that they (as well as the interspersed cooling plates 1100) may face one another along the stacking axis as shown. As illustrated, the cells 1000 define a pouch/prismatic shape such that they are easily stacked in a facingly-adjacent relationship along a stacking axis A. In one typical example, the battery pack 10 may be made up of about one hundred cells 1000, although it will be appreciated by those skilled in the art that additional or fewer cells 1000 may be needed, depending on the power requirements of vehicle 1. In the embodiment shown, the numerous individual battery cells 1000 are arranged in a combination of serial connections into six modules 100A-100F that are arranged in the repeating array as shown to generally define the pack 10. Additional components used to provide support and related operational features to battery pack 10 may include air delivery conduit, electronic control unit, bulkhead, battery interface units, manual service disconnect plug, insulation, pack tray and cover (none of which are shown). Plastic (or an equivalent) structural plate 1200 is placed to protect the cells at the adjacent front and back ends of each module 100. These plates 1200 also cause the distance between last cooling channel C of an upstream module (for example, module 100B) and the first channel C of the adjacent downstream module (for example, module 100C) to be larger than the distance of other adjacent channels within the same module 100.

A cooling system includes a pair of plenums, ducts or related fluid-bearing conduit 15, 20 that are situated fluidly above and below the various cells 1000 and modules 100, respectively. By the construction of the upper and lower plenums 15, 20 and the stacked relationship between the cells 1000 and modules 100, the cooling fluid traveling as flowpath F that encounters the channels C does so in a substantially sequential fashion; in this way, a portion of the totality of the air flow of flowpath F passes through each of the sequential channels C as they are encountered. In an ideal form, the size, shape, placement and pressure drop associated with each of the channels C is such that the delivery of air through each is substantially equal. Moreover, in one form, the inlet and outlet plenums 15, 20 are integrally formed as part of the housing of pack 10, while in another they may be affixed to or made a part of the pack 10 or related battery assembly by securing them to the housing or related cover that is used to contain the battery pack 1. Securing means used to form the plenums 15, 20 may include any suitable approach, including welding, fasteners, brazing, adhesives or the like. The plenums 15, 20 can be formed from any suitable material, so long as they provide the required structural and fluid-bearing properties. Although not shown in the present figures, it will be appreciated by those skilled in the art that corresponding sidewalls also help define the plenums 15, 20 that provide containment for flowpath F Likewise, it will be appreciated by those skilled in the art that flowpath F may be established by forcing the coolant (such as air or the like) into the upper plenum 15 by fan, compressor or other fluid driving mechanism.

Rather than encountering a constant cross-sectional area along the axial dimension of the flowpath F that is common in prior art cooling designs, the profile of plenums 15, 20 define a generally curvilinear shape to promote approximately equal pressure drops across the cooling channels C. The effects of the cross-sectional area reduction associated with the axial flow through the top plenum 15 (as well as the increase in cross-sectional area associated with the axial flow through the bottom plenum 20) is explained in more detail in the following paragraph. In general, the top curved plenum 15 tends to reduce the pressure of the inlet of cooling channels C at pack 10 exit end 14 while the bottom curved plenum 20 tends to increase the pressure of the outlet of cooling channels C at the pack 10 exit end 14. This tends to reduce the pressure differences or drive forces of cooling channels at the exit end 14 that would otherwise be much higher than those of channels C at the entrance end 12. Nevertheless, in so doing, the larger distance between last cooling channel C of an upstream module (for example, module 100E) and the first channel C of the downstream adjacent module (for example, module 100F) causes extra contraction of cross sectional area at the zone around the entrance of first two or three channels of each module 100, which in turn overly reduces the pressure differences of the cooling channels C at those zones; this in turn causes the flow rates of first two or three channels to be undesirably lower.

The flowpath F defined by plenums 15, 20 depicted in FIG. 2 corresponds to a modified variant of the Z-type air cooling mentioned above, where the taper due to the curvilinear shape defines a contraction in cross-sectional flow area in the upper plenum 15 along flowpath F and an expansion in cross-sectional flow area in the lower plenum 20 along flowpath F. The flowpath F enters pack 10 via entrance end 12 and exits at the exit end 14. In one form, the taper of the lower plenum 20 may be made substantially less than that of the upper plenum 15. The flowpath F that passes through the exit end 14 may be fluidly connected to an exhaust conduit (not shown) that may in turn be vented to the atmosphere or an external depository for fluid removal. In a Z-type cooling flow pattern in a conventional air-cooled battery pack with a constant cross-sectional area, Bernoulli's Equation dictates that—if one ignores friction loss—pressures and flow velocities are inversely related:

$$\frac{p_1}{\rho} + \frac{v_1^2}{2} = \frac{p_2}{\rho} + \frac{v_2^2}{2}$$

where $p_1$ is the pressure of the cooling fluid at the inlet (i.e., entrance end) of the top (i.e., inlet) plenum, $\rho$ is the density of the cooling fluid, $v_1$ is the velocity of the cooling fluid at the inlet of the top plenum, $p_2$ is the pressure of the cooling fluid at the end of the top plenum that is opposite of the inlet and $v_2$ is the velocity of the cooling fluid at the end of the top plenum that is opposite of the inlet. Thus, the pressure in the plenum near the opposite end (where the velocity drops off to almost nothing) is greater than that near the inlet, although the aforementioned friction loss tends to reduce the magnitude of pressure difference. Conversely, the pressure in the lower (i.e., output) plenum in the end that is the axial equivalent of the top plenum input is higher than that of the part of the lower plenum where the coolant flow is ultimately discharged from the pack:

$$\frac{p_3}{\rho} + \frac{v_3^2}{2} = \frac{p_4}{\rho} + \frac{v_4^2}{2}$$

where $p_3$ is the pressure of the cooling fluid at the inlet (i.e., entrance end) of the bottom (i.e., output) plenum, $v_3$ is the velocity of the cooling fluid at the inlet of the bottom plenum, $p_4$ is the pressure of the cooling fluid at the end of the bottom plenum that is opposite of the inlet and $v_4$ is the velocity of the cooling fluid at the end of the bottom plenum that is opposite of the inlet. In such circumstance, the pressure difference ($p_2-p_4$) at the end of the pack opposite of the cooling flow inlet is greater than the pressure difference ($p_1-p_3$) at the end of the pack adjacent the cooling flow inlet. In that case, the mass flow rate of coolant at the opposite end of the pack is greater than the mass flow rate at the initial cooling flow inlet end; such disparity tend to result in larger local temperatures of the battery cells 1000 at the pack 10 inlet/entrance end 12 than at the outlet/exit end 14. By employing a tapered curvilinear duct (rather than the constant cross-sectional area version discussed above), the discrepancy between ($p_2-p_4$) and ($p_1-p_3$) can be eliminated or significantly reduced, which in turn promotes a more uniform cooling fluid flow rate through all of the channels C in the pack.

While such an approach works well for an idealized pack 10, the reality is that additional structure (such as the plastic plates 1200 mentioned above in conjunction with FIGS. 2 and 2A that are used for end cell 1000 protection within each module 100) introduce additional complexity. In particular, such structure causes additional inter-module gaps that increase the distance between the last channel C of a fluidly upstream battery module 100 and the first channel C of an adjacent downstream module 100. The large channel C distance causes a contraction that overly reduces the height or cross-sectional area at the zone around the entrance of first two or three channels C of each module 100, which in turn overly reduces the inlet pressures of the cooling channels C at those zones. Therefore, the flow rates of first two or three channels C of each module 100 are undesirably lower; this will be discussed in more detail in conjunction with FIG. 3. Beads 17 (also referred to herein as undulations or related disturbing structure) are formed in the upper plenum 15 of the present curvilinear ducts to offset these undesirably low cooling flow rates through the cooling channels C of the first two or three channels of each module 100. Thus, beads 17 provide a height or cross sectional area deviation from their remainder of the wall structure or containment structure that gives definition to flowpath F, thereby restoring the lost cross sectional area that results from the over contraction of the taper due to additional inter-module gaps. In a preferred form, beads 17 are formed as extending outward (i.e., away) from the top surface of the frame 1150 that holds the upper edges of the stacked cells 1000 such that they define a local increase in plenum 15 volume. It will be recalled that in fluid dynamics (such as the Bernoulli Equation mentioned above, especially those involving incompressible flows) that decreases in flow speed (such as due to increase in height or cross sectional area by the beads 17) correspond to increases in static pressure. It is this localized increase in volume that leads to the lower flow speed and resultant static pressure that the present inventors have taken advantage of as a way to offset the localized decrease in static pressure at the same region or zone caused by the larger distance between the last channel of a fluidly upstream battery module 100E and the first channel of an adjacent downstream module 100F.

During cooling system operation associated with battery pack 10, air or a related cooling fluid is supplied from a source to the inlet at the entrance end 12 of the first (i.e., upper) plenum 15 such that it is circulated along flowpath F and caused to flow into the fluid channels C to promote the transfer of heat from the planar, outer surfaces of the various battery cells 1000 and their cooling plates 1100 (collectively, along with frame 1150 defining a battery unit) to the fluid. The heated fluid is then caused to flow into the second (i.e., lower) plenum 20 located beneath the cells 1000. The increased local pressure generated by the beads 17 in the portion of the first (i.e., upper) plenum 15 near the first few local channels C within each module 100 helps minimize the variation of flow rates between the various channels C within each such module 100. After passing though channels C, the heated fluid is then exhausted from the flowpath F through the exit end 14 at the lower plenum 20 and optional exhaust conduit.

As mentioned above, by understanding that the fluid-driving pressure in the forward portion of the channels C in each module 100 would otherwise be significantly different than those of channels C farther back in the module 100 absent the beads 17, the present bead pattern and locations shown and described significantly improve both pack flow uniformity and plenum stiffness. Likewise, the distance between the last channel C of an upstream module 100E and the first channel C of an adjacently-downstream module 100F is larger than the distance between adjacent channels C in the same module. As such, this large distance can cause the pressure difference between the inlet and the outlet of the first few (for example, two or three) channels of each module to be lower than those of the end channels due to the extra contraction. As a result, the variation of the flow rate of individual cooling channels C in the battery modules 100 at the pack 10 exit can be as high as 20%. In order to increase the inlet pressure of the first few forward channels at each battery module 100, the beads 17 placed at the inlet plenum 15 have been proposed to increase the cross section area of the inlet plenum at the portion of the plenum 15 that corresponds to these first few cooling channels C. In one particular version (such as shown in FIG. 2B), each battery module 100 has two beads 17 formed within the inlet plenum 15. As can be seen, the width W of each bead 17 is approximately the same as the distance D between two adjacent channels C in the same module 100. The present inventors have determined via analytical studies that the variation of flow rate of cooling channels C of the entire battery pack 10 can be reduced by approximately 50%.

The increase in cross-sectional area of the portion of the inlet plenum 15 that corresponds to the first few cooling channels of each module 100 made possible by the location and pattern of beads 17 has—by virtue of the fluid dynamics mentioned above—an attendant increase in the pressure at these zones. Significantly, the increase of the height or cross sectional area due to beads 17 is significant at portions of plenum 15 where larger variations of the flow rates of individual channels C within the modules 100E and 100F occur. Thus, the pressure reduction at those areas caused by larger distance between the last channel of a fluidly upstream battery module 100 and the first channel of an adjacent downstream module 100 can be offset. Of primary concern to the present inventors is that the pressure difference between the top and bottoms of each cooling channel C within a given module 100 be as close to one another as possible. To that end, strategic placement of beads 17 offsets the pressure decreases caused by the large distance between the last channel or channels C of an upstream module (for example, 100E) and the first channel or channels of the next downstream module (for example, 100F).

Figure 3:
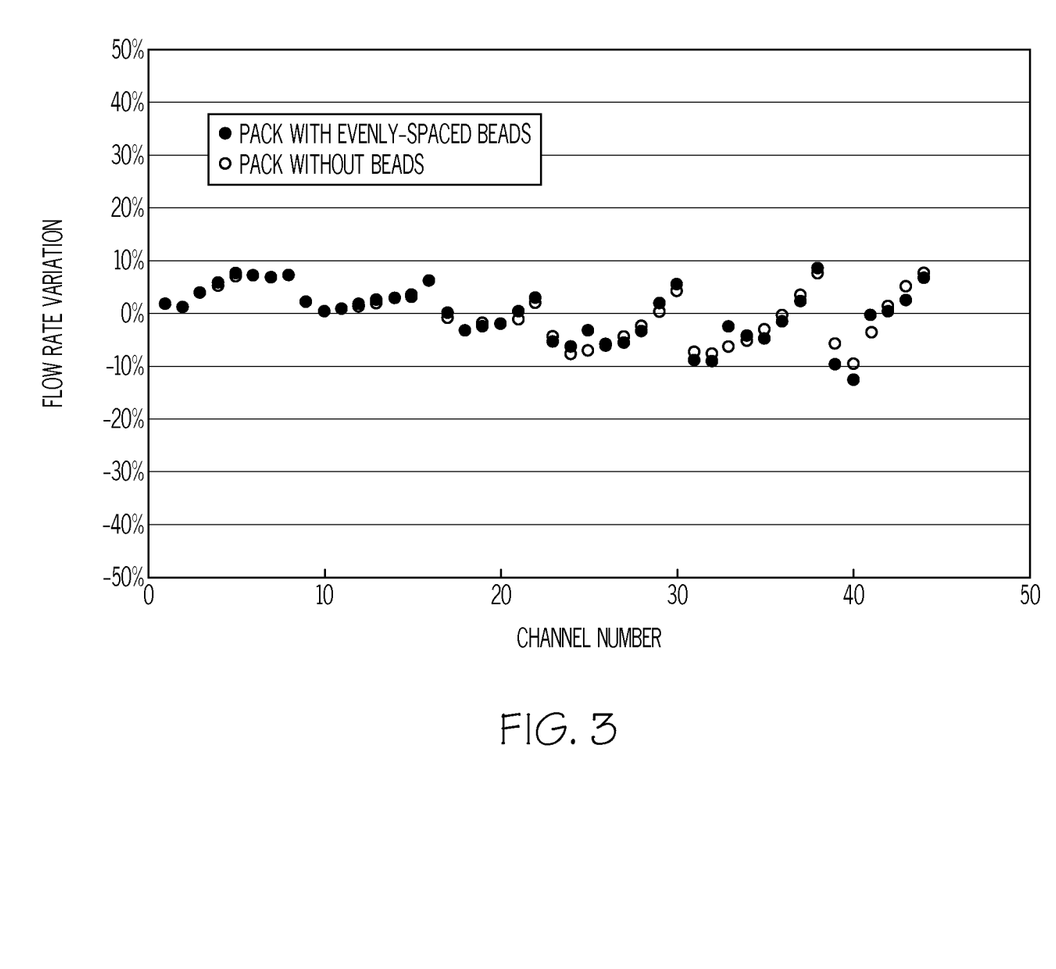
FIG. 3 shows air cooling flow rate variations relative to a cell's position within a notional stack that does not include the approach of the present invention.

Referring next to FIG. 3, the flow rate variation of analytical studies conducted by the present inventors on a curvilinear plenum (both with and without beads) in accordance with a notional battery pack cooling scheme is shown. The general bead locations are determined based on the improvement of the plenum stiffness relative to existing designs, where in particular the beads may be placed uniformly along the axial dimension of the plenum. In so doing, some beads may be located at the portion of the plenum that corresponds to those last cooling channels in a particular module. As mentioned above, this may result in an undesirable increase of the maximum variation of the flow rate of cooling air through individual cooling channels in the pack, as shown in the figure. FIG. 3 shows a notional upper plenum with a curvilinear flowpath that covers six sequentially-encountered modules in a manner similar to the six modules depicted in FIG. 2. As presently shown, modules 100A, 100B, 100D and 100E of FIG. 2 each have 8 channels (represented by the 8 dotted data points in FIG. 3), while modules 100C and 100F each have 6 channels; these differing values were merely chosen for analytical convenience, and are not meant to represent any particular pack 10 configuration. Likewise, it will be appreciated by those skilled in the art that the number of cells within a module, modules within a pack and related designs pertaining to these and the cooling channels C can be varied depending on the power needs of the application employing such packs 10, modules 100 and cells 1000, and that such variations are within the scope of the present invention. The flow rate variations that occur in the top module of such a plenum are particularly pronounced in the downstream modules, and even more so between the last channel of an upstream module and the first channel of the adjacent downstream module. As mentioned above, much of this variation is due to the gaps between these adjacent modules due to the presence of frames and related protective structure. Significantly, even the addition of a substantially uniform axial placement of beads does not significantly remedy the flow rate variation problem.

Figure 4:
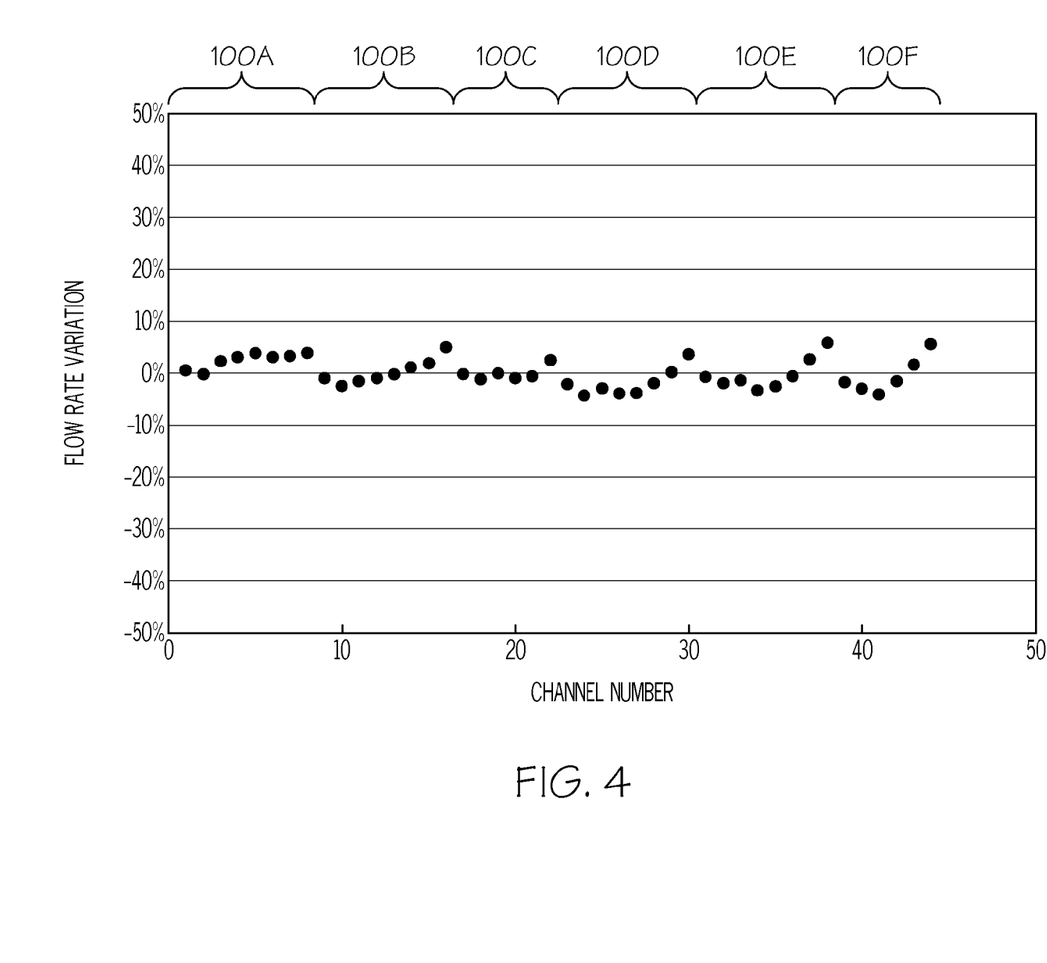
FIG. 4 shows air cooling flow rate variations relative to a cell's position within a stack according to an aspect of the present invention.

Referring next to FIG. 4, the present inventors have determined that the extra contraction and friction loss at the flow region between adjacent modules 100 cause flow rates of the first three channels C of each module 100 to be lower than those of the end channels C in the same module 100. The particular location and pattern of the beads 17 (shown in FIG. 2B as recesses formed in the plenum 15 surface) of the present invention increases the cross section area of upper plenum 15 at the region adjacent the first three channels C of each module 100 as a way to increase the inlet pressure of those channels. As a result, the maximum variation of flow rate of cooling channels C of the entire battery pack 10 can be reduced by approximately 50% compared to the approach used in FIG. 3. The inventors have also determined that the selective placement of the beads 17 at or near the first few cells 1000 of each module 100 can be done without measurable changes in upper plenum 15 stiffness relative to configurations where the beads are uniformly placed.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a battery or related source of electric power that in turn may be used to provide motive power. A device may also refer to a vehicle incorporating the source of motive power or other equipment that may make up, or be used in conjunction with, the vehicle or source of motive power; the nature of the device will be clear from the context. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context. Likewise, the invention may be used in conjunction with battery cells unrelated to automotive applications, where temperature-sensitive equipment may need added thermal protection; such additional configurations are understood as being within the scope of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:
1. A battery pack assembly comprising:
 a plurality of battery cells arranged along an axis within a plurality of modules such that a cooling channel is defined between each adjacent pair of said battery cells within each of said modules;
a cooling plenum configured to deliver a cooling fluid substantially sequentially to said battery cells through said cooling channels, at least a portion of said cooling plenum defining a cross-sectional area that varies along said axis; and
at least one stiffness-enhancing bead recessed into a surface of said cooling plenum to thereby define a localized fluid volume increase that is adjacent a forward portion of at least one of said modules such that at least a portion of said cooling fluid being conveyed through said cooling plenum and delivered to said at least one of said modules experiences a localized pressure increase in a region adjacent said at least one bead in order to provide approximately equal pressure drops across said cooling channels that are formed in said at least one of said modules.

2. The assembly of claim 1, wherein said cooling plenum comprises an inlet cooling plenum configured to deliver said cooling fluid to said cooling channels and an outlet cooling plenum configured to convey said cooling fluid away from said cooling channels.

3. The assembly of claim 2, wherein said at least one bead is formed within a surface of said inlet cooling plenum to define a local increase in said cross-sectional area of said region.

4. The assembly of claim 3, wherein a width of each of said at least one bead is substantially the same as the distance between two adjacent channels in said at least one of said modules.

5. The assembly of claim 1, wherein said cooling plenum is tapered along said axis.

6. The assembly of claim 1, wherein said cooling plenum has a curvilinear shape along said axis.

7. The assembly of claim 1, wherein at least some of said cells and modules are arranged along a stacking axis of said cells.

8. The assembly of claim 1, further comprising an additional stiffness-enhancing bead formed on a surface of said cooling plenum that is axially between an adjacent pair of said modules such that at least a portion of said cooling fluid being conveyed therebetween experiences a localized pressure increase relative to no such additional stiffness-enhancing bead being present.

9. A battery pack assembly comprising:
a plurality of modular battery cells configured to generate electric current, said battery cells being substantially aligned with one another along an axis to define a stacked relationship therebetween;
a plurality of cooling channels, each configured to form a cooling fluid flow path between an adjacently-spaced pair of said battery cells within said stacked relationship; and
a curved plenum fluidly coupled to the battery cells and configured to circulate a cooling fluid through said cooling channels, at least a portion of said curved plenum defining a cross-sectional area that changes along said axis, and at least one stiffness-enhancing bead indented into a surface of said curved plenum such that a portion of said cooling fluid being conveyed through said curved plenum is delivered with a localized pressure increase to at least one of said cooling channels that is adjacent said at least one bead.

10. The battery pack of claim 9, wherein a portion of said plurality of cells and a corresponding portion of said plurality of cooling channels define a battery module.

11. The battery pack of claim 10, wherein said stacked relationship of said plurality of cells within said module is such that said cooling fluid being delivered under increased pressure to said at least one cooling channel that is adjacent said at least one bead takes place at a forward portion of said module.

12. The battery pack of claim 9, wherein a cooling flowpath defined by said plenum is curvilinearly tapered.

13. The battery pack of claim 12, wherein said at least a portion of said plenum defining at least one stiffness-enhancing bead formed on a surface thereof comprises an inlet plenum.

14. The battery pack of claim 10, wherein said at least one stiffness-enhancing bead is formed on a surface of said plenum that is adjacent an axially upstream cooling channel of at least one of said battery modules while not on a surface of said plenum that is adjacent an axially downstream cooling channel of said at least one of said battery modules.

15. An automobile propulsion system comprising:
an electric motor;
a plurality of modular battery cells configured to deliver electric power to said motor, at least some of said battery cells being substantially aligned with one another along a stacking axis to define a stacked relationship therebetween;
a plurality of cooling channels within the modular battery cells, each of the cooling channels being configured to form a cooling fluid flow path between an adjacently-spaced pair of said battery cells within said stacked relationship; and
a curved plenum fluidly coupled to the modular battery cells and configured to circulate a cooling fluid through said cooling channels, at least a portion of said curved plenum defining a cross-sectional area that varies along said stacking axis, said plenum further defining at least one stiffness-enhancing bead recessed into a surface thereof to thereby define a localized fluid volume increase such that a portion of said cooling fluid being conveyed through said plenum is delivered with a localized pressure increase to at least one of said cooling channels that are adjacent said at least one bead.

16. The propulsion system of claim 15, wherein said delivery of said cooling fluid to said cooling channels takes place substantially sequentially.

17. The propulsion system of claim 15, wherein said at least a portion of said plenum that includes said at least one bead has said at least one bead disposed adjacent an axially upstream cooling channel of at least one battery module that comprises at least a portion of said plurality of modular battery cells, while said at least one bead is not on a surface of said plenum that is adjacent an axially downstream cooling channel of said at least one battery module.

18. The propulsion system of claim 15, further comprising an internal combustion engine configured to provide motive power to said automobile.

19. The propulsion system of claim 15, wherein said varying cross-sectional area defined by said plenum is tapered from a relatively large value of said cross-sectional area to a relatively small value of said cross-sectional area.

20. The propulsion system of claim 19, wherein said tapered flowpath further defines a curvilinear shape along said taper.

* * * * *